United States Patent
Forrer, Jr. et al.

(10) Patent No.: US 8,307,128 B2
(45) Date of Patent: Nov. 6, 2012

(54) SYSTEM AND METHOD TO IMPROVE SEQUENTIAL SERIAL ATTACHED SMALL COMPUTER SYSTEM INTERFACE STORAGE DEVICE PERFORMANCE

(75) Inventors: Thomas R. Forrer, Jr., Round Rock, TX (US); Jason E. Moore, Austin, TX (US); Asghar Tavasoli, Austin, TX (US); Abel E. Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 1733 days.

(21) Appl. No.: 11/608,512

(22) Filed: Dec. 8, 2006

(65) Prior Publication Data

US 2008/0141256 A1 Jun. 12, 2008

(51) Int. Cl.
*G06F 3/00* (2006.01)
*G06F 13/00* (2006.01)
(52) U.S. Cl. ......... 710/8; 710/2; 710/5; 710/33; 710/36; 710/65
(58) Field of Classification Search .................. None
See application file for complete search history.

(56) References Cited

U.S. PATENT DOCUMENTS

2005/0028042 A1* 2/2005 Watanabe .................. 714/42
2005/0080940 A1* 4/2005 Flynn ........................ 710/15
2006/0271639 A1* 11/2006 Kumagai et al. ............ 709/217

OTHER PUBLICATIONS

Elliot, Rob, SAS Management Upper Layers and Port Layers, Sep. 30, 2003, Hewlett Packard, [online, accessed on Jan. 26, 2012], URL: http://www.scsita.org/sas_library/tutorials/SAS_Management_upper_layers.pdf.*

* cited by examiner

*Primary Examiner* — Scott Sun
(74) *Attorney, Agent, or Firm* — Yudell Isidore Ng Russell PLLC (57) ABSTRACT

A system, computer-implementable method, and computer-readable medium for improving sequential serial attached small computer system interface storage device performance. According to a preferred embodiment, a microprocessor within a target device receives a collection of tasks from at least one initiator device via a collection of initiator paths. The target device is a cyclic non-volatile memory medium. The microprocessor queues the collection of tasks according to a collection of task list. Each task list corresponds to a respective initiator path. The microprocessor combines the collection of tasks in an execution queue. The collection of tasks on the execution queue is reordered based on a priority scheme. The microprocessor executes the collection of tasks from the execution queue.

16 Claims, 7 Drawing Sheets

SYSTEM AND METHOD TO IMPROVE SEQUENTIAL SERIAL ATTACHED SMALL COMPUTER SYSTEM INTERFACE STORAGE DEVICE PERFORMANCE

BACKGROUND OF THE INVENTION

1. Technical Field

The present invention relates in general to the field of data processing systems, and in particular, the field of storage devices within data processing systems. Still more particularly, the present invention relates to a system and method to improve storage device performance within data processing systems.

2. Description of the Related Art

The Serial Attached Small Computer System Interface (SAS) architecture can support multiple paths from a SAS initiator device to a SAS target device. Multiple paths are possible because most SAS target devices have at least SAS two ports and most SAS Initiator devices have multiple SAS ports. SAS initiator devices, when dispatching tasks to SAS target devices, may utilize different paths based upon path availability. Therefore, if one path is being utilized by another SAS target device that is returning data to the SAS initiator device, the SAS initiator device will connect to the SAS target device via an alternate path to send another task.

Each SAS initiator device path is viewed as a separate SAS initiator device by a SAS target device. The SAS architecture also supports multi-initiator environments, which enable different system SAS initiator devices to talk through the same SAS infrastructure to SAS target devices. SAS target devices are normally configured to maintain a separate task set for each SAS initiator device. The maintenance of different task sets is performed to accommodate error recovery procedures on a per SAS initiator device basis.

Parallel Small Computer System Interface (Parallel SCSI), the predecessor architecture to SAS architecture, supported multi-initiator environments. However, a SCSI Target device only has one path to each initiator device. Therefore, task sets are maintained by each target device on a per SCSI adapter basis.

As previously discussed, SAS target devices maintain separate task sets on a per path basis. Since there may be two or more paths to an SAS initiator device, a single SAS Target device may have two or more task sets for a single SAS initiator device. For example, if a SAS initiator device begins sending sequential tasks (e.g., commands or SCSI command descriptor blocks) to a SAS target device, one task may travel down a first path and a second task may travel down a second path. The SAS target device will keep these sequential tasks in separate task sets. Current SAS implementations do not recognize sequential SCSI commands as being sequential if they are queued in separate task sets. Therefore, if the sequential tasks are sequential write operations that require write operations to positionally-related locations on a hard disk drive, current SAS implementations may result in a first write operation targeting a first disk location, a second write operation targeting a second disk location located at another part of the hard disk, and a third write operation targeting a third disk location very near the first disk location. To perform the three write operations, the hard disk drive needs to rotate the disk to the first disk location, rotate the disk again to the second disk location, and rotate the disk a third time to a third disk location that is near the first disk location. These unnecessary disk rotations drastically affect the performance of the SAS architecture in the case of sequential write operations.

On the other hand, parallel SCSI disk drives keep sequential write operations from the same initiator device in the same task set and will execute a series of sequential write operations without intervening disk rotations. Therefore, there is a need for a system and method for improving sequential SAS disk drives to overcome the aforementioned limitations of the prior art.

SUMMARY OF THE INVENTION

The present invention includes a system, computer-implementable method, and computer-readable medium for improving sequential serial attached small computer system interface storage device performance. According to a preferred embodiment, a microprocessor within a target device receives a collection of tasks from at least one initiator device via a collection of initiator paths. The target device is a cyclic non-volatile memory medium. The microprocessor queues the collection of tasks according to a collection of task lists. Each task list corresponds to a respective initiator path. The microprocessor combines the collection of tasks in an execution queue. The collection of tasks on the execution queue is reordered based on a priority scheme. The microprocessor executes the collection of tasks from the execution queue.

In a preferred embodiment of the present invention, the microprocessor determines whether there is more than one non-empty task set. In response to determining that there is more than one non-empty task set, the microprocessor executes task selection code to recombine and reorder the collection of tasks into a single execution queue.

In another preferred embodiment of the present invention, the microprocessor determines whether the collection of tasks should be executed. In response to determining the collection of tasks should be executed, the microprocessor selects a task for execution from the collection of task lists. Then, the microprocessor sends the selected task to the execution queue for execution.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN ILLUSTRATIVE EMBODIMENT

The present invention includes a system and method for improving sequential serial attached small computer system (SAS) interface storage device performance. According to an embodiment of the present invention, a hard drive includes a microprocessor, a cache, and a read-only memory (ROM)/electrically-erasable programmable read-only memory (EEPROM). Stored the EEPROM is task selection code, executable by the microprocessor, that enables reordering commands residing in multiple task sets into an execution queue to improve the performance of the SAS interface storage device in processing sequential commands.

Figure 1:
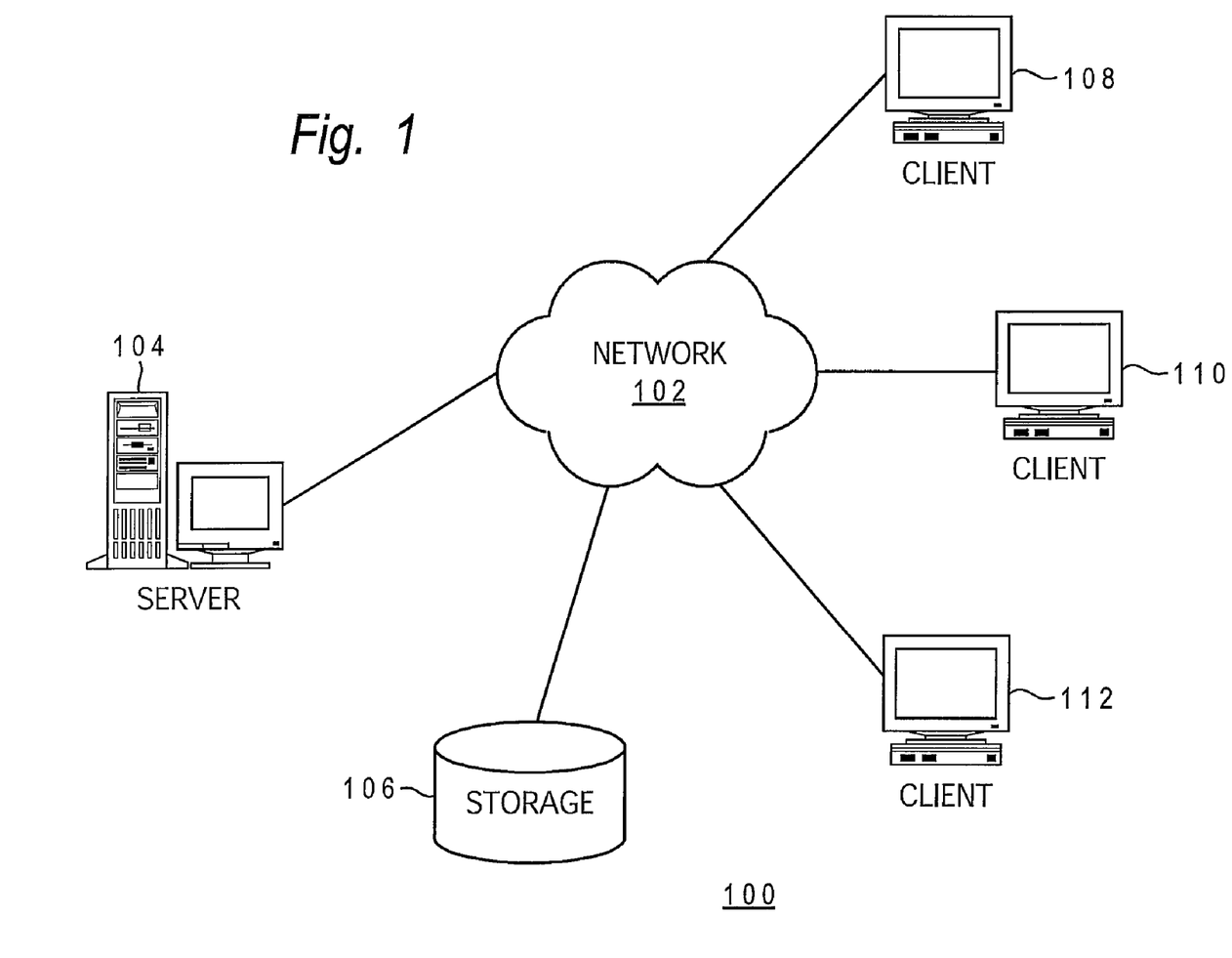
FIG. 1 is a block diagram illustrating an exemplary network in which an embodiment of the present invention may be implemented.

Referring now to FIG. 1, there is illustrated a block diagram depicting an exemplary network 100 in which an embodiment of the present invention may be implemented. As illustrated, network 100 includes a server 104, storage 106, a collection of clients 108-112, all coupled via a communications fabric 102. As well-known by those with skill in the art, communication fabric 102 may be implemented by a local-area network, wide-area network, Wi-Fi (IEEE 802.11x), Ethernet, Internet, or any other type of network.

Figure 2A:
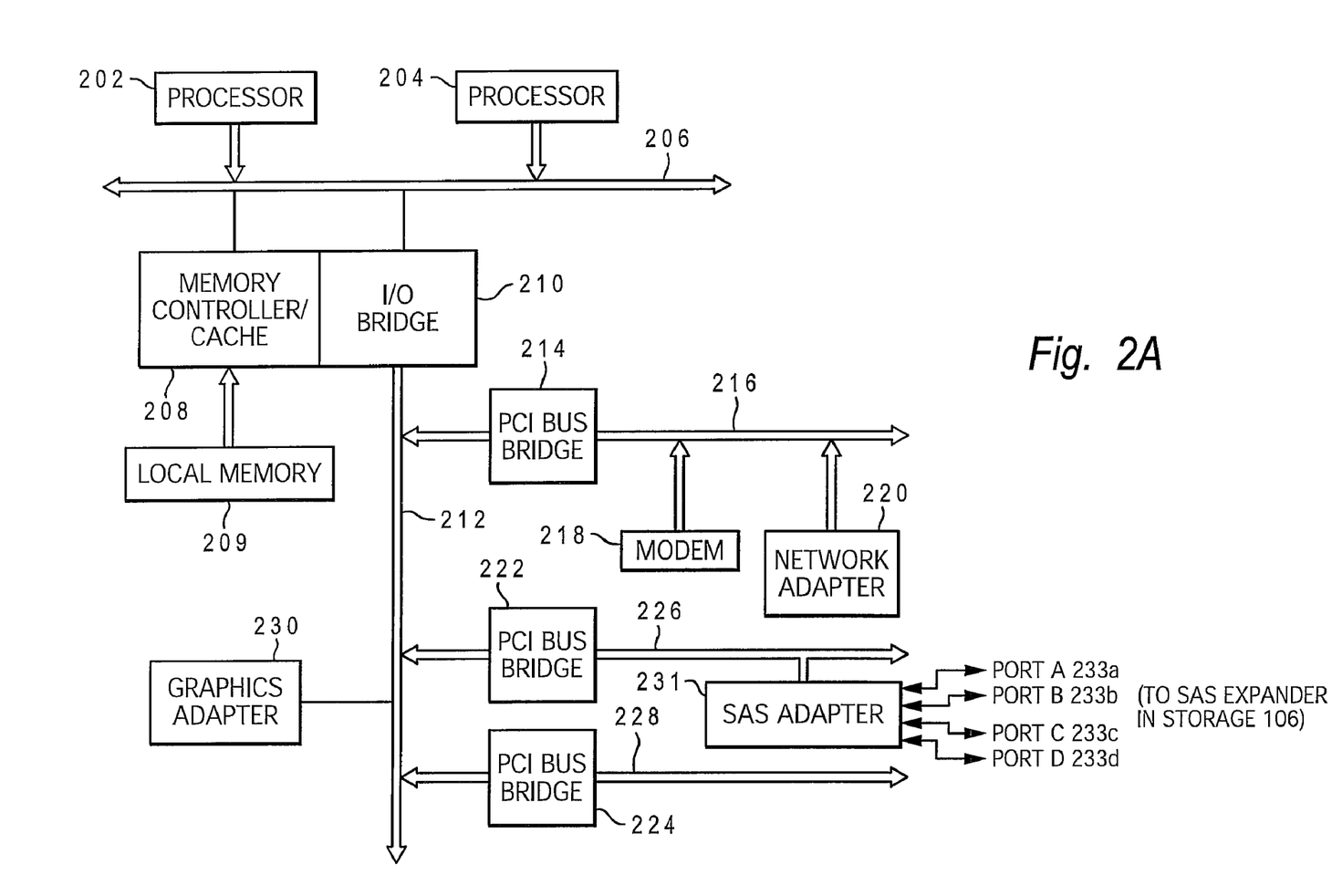
FIG. 2A is a block diagram depicting an exemplary data processing system in which an embodiment of the present invention may be implemented.

Storage 106 includes a collection of hard drives 232a-232d and SAS expanders 238a-238b (FIG. 2B) utilized to interface with SAS adapter 231 (FIG. 2A). Server 104 and clients 108-112 may communicate with storage 106 via their respective SAS adapters 231, as discussed herein in conjunction with FIGS. 2A-2B. Those skilled in the art will appreciate that exemplary network 100 can include many additional components not specifically illustrated in FIG. 1. Because such additional components are not necessary for an understanding of the present invention, they are not illustrated in FIG. 1 or discussed further herein.

FIG. 2A is a block diagram depicting an exemplary data processing system 200, which may be utilized to implement server 104 and clients 108-112. As depicted, processors 202-204 are coupled to a local memory 209 via system bus 206 and memory controller/cache 208. Preferably, local memory 209 may be implemented as a collection of dynamic random access memory (DRAM) modules. Also, processors 202-204 are coupled to I/O bridge 210 via system bus 206 to enable communication with I/O bus 212.

Those with skill in the art will appreciate that I/O bus 212 may be implemented as PCI, industry standard architecture (ISA), or any other peripheral bus. PCI bus bridge 214 couples PCI bus 216 to I/O bus 212 and enables communication with modem 218 and network adapter 220. Modem 218 and/or network adapter 220 enable data processing system 200 to communicate on a network, such as network 100.

PCI bus bridge 222 couples PCI bus 226 to I/O bus 212 and interfaces with SAS adapter 231. SAS adapter 231 acts as an SAS initiator within data processing system 100, which enables any requesting device (e.g., processors 202-204, peripherals such as modem 218 or network adapter 220, etc.) to access hard drives 232a-232d, illustrated in FIG. 2B, within storage device 106. SAS adapter 231 includes four ports, depicted in FIG. 2A as Port A 233a, Port B 233b, Port C 233c, and Port D 233d. These ports enable SAS adapter 231 to send commands (herein referred to as "tasks") to storage 106, as described herein in more detail in conjunction with FIG. 2B. PCI bus bridge 224 couples PCI bus 228 to I/O bus 212. PCI bus 226 enables other peripherals (not shown) to communicate on I/O bus 212.

Figure 2B:
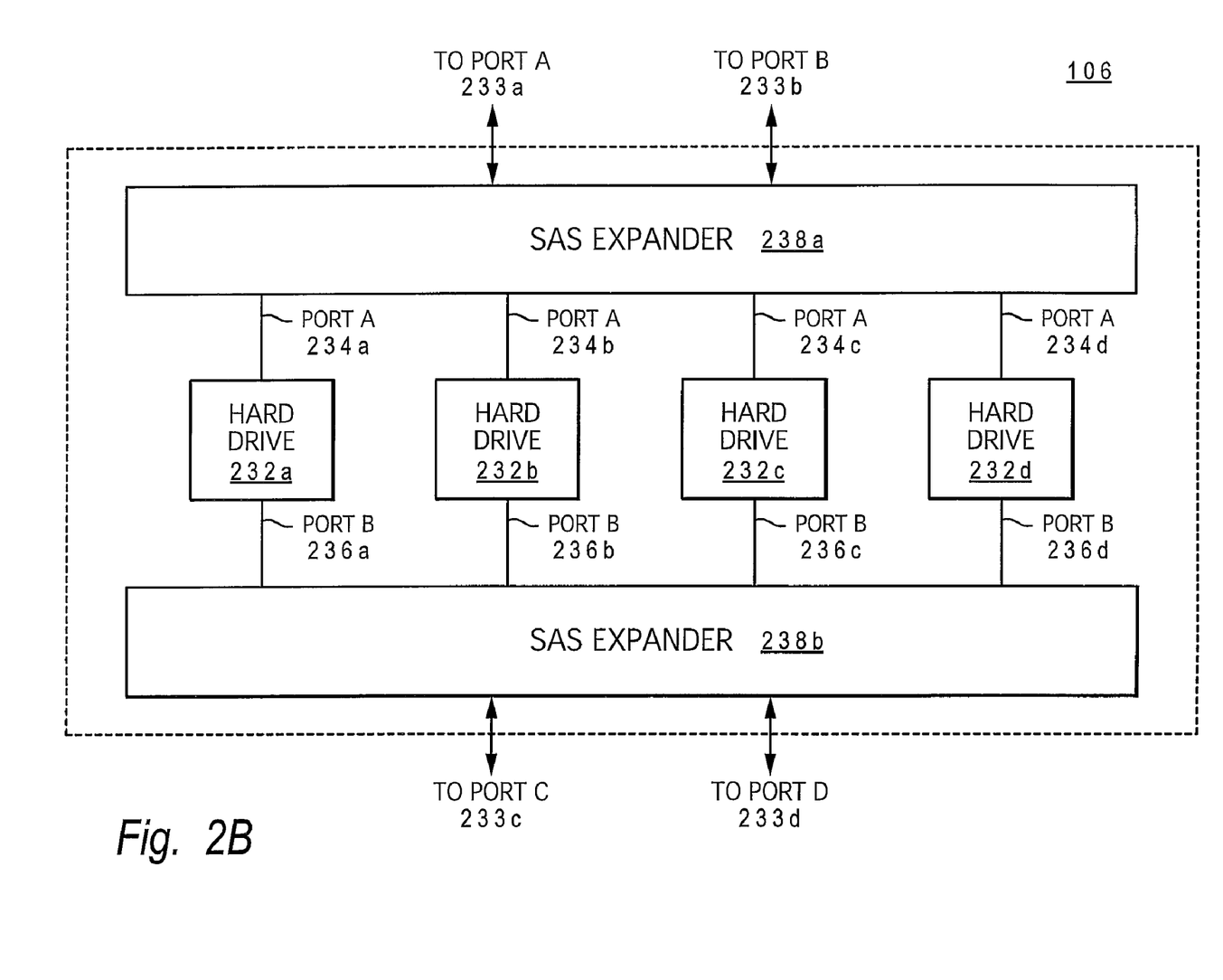
FIG. 2B is a block diagram illustrating an exemplary storage device in which an embodiment of the present invention may be implemented.

FIG. 2B is a block diagram illustrating an exemplary storage 106 in which an embodiment of the present invention may be implemented. As illustrated, storage 106 includes a collection of cyclic non-volatile memory media such as hard drives 232a-232d (which are SAS target devices) and SAS expanders 238a-238b. SAS expander 238a is coupled to SAS adapters 231 (present in server 104 and clients 108-112) via port A 233a and port B 233b while SAS expander 238b is coupled to SAS adapters 231 via port C 233c and port D 233d. Hard drives 232a-232d are coupled to SAS expander 238a via port A 234a-234d and are coupled to SAS expander 238b via port B 236a-236d. Those with skill in the art will appreciate that the present invention does not limit storage 106 to four hard drives 232a-232d, but may include any number of hard drives.

According to an embodiment of the present invention, SAS expanders 238a-238b includes four paths (port A 233a, port B 233b, port C 233c, and port D 233d) to each dual ported hard drive 232a-232d. As discussed herein in more detail in conjunction with FIGS. 3-5, each hard drive 232a-232d maintains a separate task set for each path. In order to communicate with storage 106, a task is first sent to SAS adapter 231 (herein referred to as a "SAS initiator device") by a component of data processing system 200 (e.g., processors 202 and 204). The SAS initiator device sends the task via any available SAS initiator path (port A 233a, port B 233b, port C 233c, or port D 233d) to storage 106. SAS expanders 238a-238b forward the task to at least one hard drive 232a-232d, which are herein referred to as "SAS target devices". Each SAS target device maintains a separate task list for each SAS initiator path, as discussed herein in more detail in conjunction with FIGS. 3-4. Therefore, if SAS adapter 231, which is considered an SAS initiator device, sends commands to storage 106 and the commands are sequential operations (e.g., sequential write operations) that are spread across the four paths, the sequential operations will be categorized in separate task sets in each hard drive 232a-232d.

Figure 3:
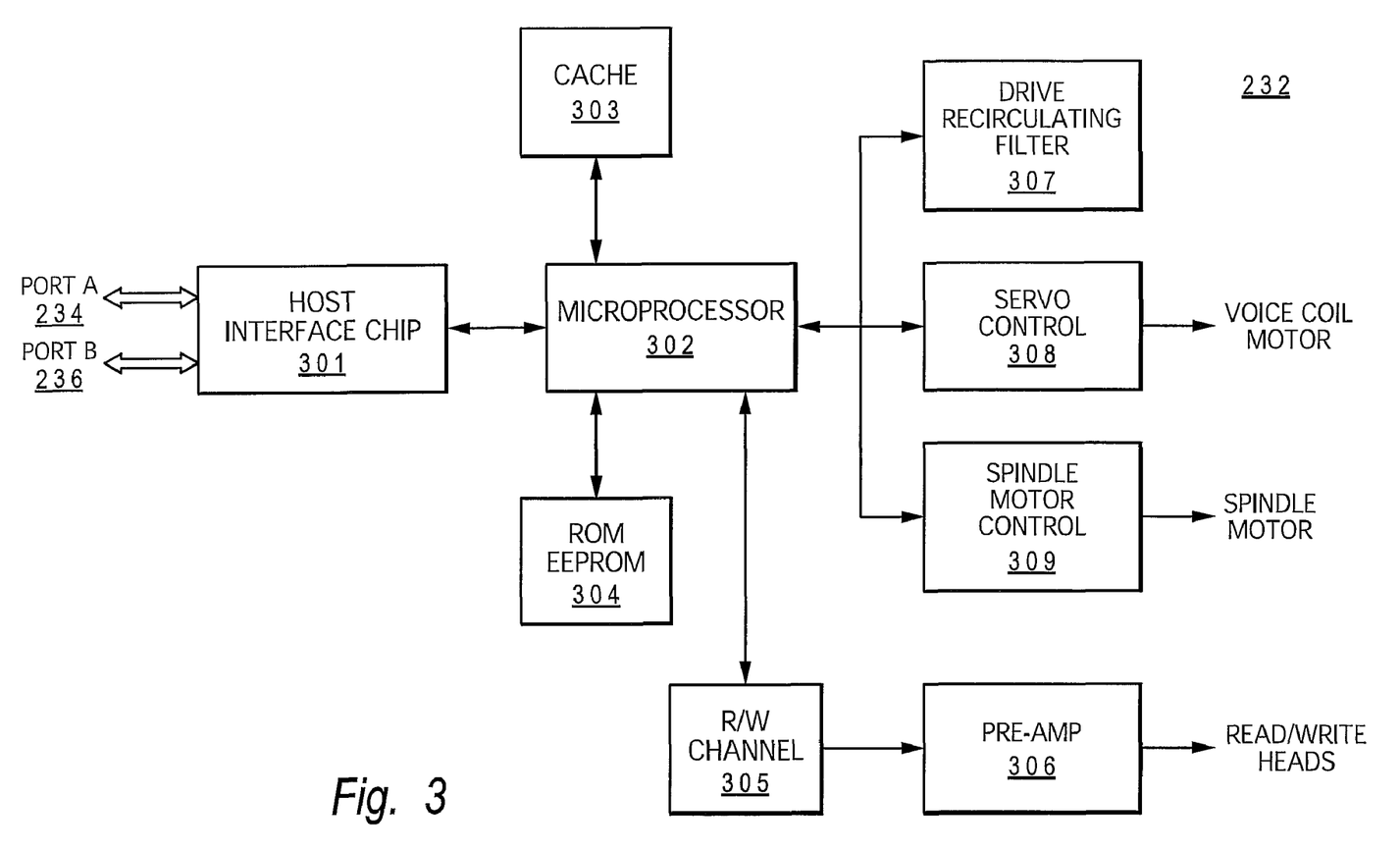
FIG. 3 is a block diagram depicting an exemplary hard drive in which an embodiment of the present invention may be implemented.

FIG. 3 is a block diagram illustrating an exemplary hard drive 232 according to an embodiment of the present invention. As depicted, hard drive 232 includes host interface chip 301 for coordinating communication between hard drive 232 and SAS initiator devices, such as SAS adapter 231. Upon system startup, microprocessor 302 loads boot data from read-only memory (ROM)/electrically-erasable programmable read-only memory (EEPROM) 304. During hard drive operation, microprocessor 302 queues tasks sent to hard drive 232 in cache 303. Read/Write (R/W) channel 305 and pre-amp 306 enables microprocessor 302 access to read/write heads in hard drive 232.

As discussed herein in more detail, hard drive 232 supports multiple paths (e.g., port A 233a, port B 233b, port C 233c, port D 233d) from an SAS initiator device (e.g., SAS adapter 231). When dispatching tasks to a SAS target device (e.g., hard drive 232), SAS initiator devices may utilize different paths depending on path availability. For example, if one path is being utilized by another SAS initiator device, the first SAS initiator device will connect via an alternate path to the SAS target device to send the tasks. Each SAS initiator path will be seen by the SAS target device as a separate SAS initiator. As a SAS target device, hard drive 232 maintains a separate task list for each SAS initiator path. These task lists are stored within cache 303.

Microprocessor 302 controls the hard disk drive's voice coil and spindle motor via servo control 308 and spindle motor control 309, respectively These motors manipulate the hard disk drive platters, which store data and instructions. Microprocessor 302 is also coupled to at least one air filter, such as drive recirculating filter 307, which is designed to filter small particles of media scraped off the platters during read/write head takeoffs and landings (and possibly other small particles dislodged inside the drive during operation).

Figure 4:
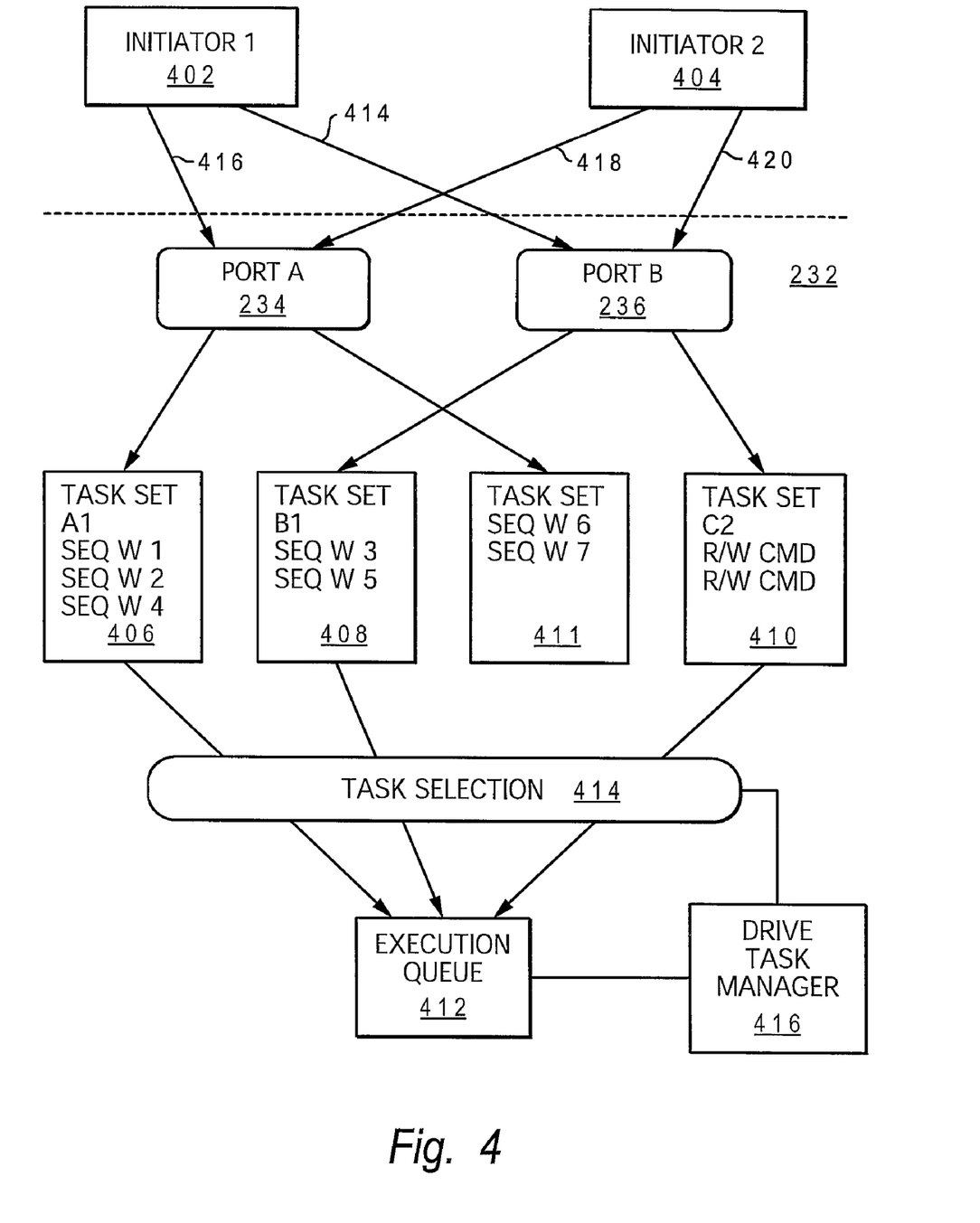
FIG. 4 is a block diagram illustrating task set management by the hard drive shown in FIGS. 2 and 3.

FIG. 4 is a block diagram depicting task set management by hard drive 232 according to an embodiment of the present invention. As shown, SAS initiator device 1 402 and SAS initiator device 2 404 are sending commands via multiple SAS initiator paths 414-420. SAS initiator paths 416 and 418 are entering hard drive 232 via port A 234 while SAS initiator paths 414 and 420 are entering hard drive 232 via port B 236.

As SAS initiator device 1 402 and SAS initiator device 2 404 send commands to hard drive 232, the commands are queued in task sets 406, 408, 410, and 411 (all stored in cache 303), depending on which SAS initiator path 414-420 the commands are sent. Execution queue 412 is also stored in cache 303 and buffers commands from task sets 406, 408, 410, and 411 that are re-ordered by task selection code 414, which is executed by microprocessor 302. Those with skill in the art will appreciate that the present invention in no way limits the number of task sets and initiator paths that may be implemented. FIG. 4 shows only four task sets and four initiator paths for illustrative purposes and to facilitate discussion.

Task selection code 414 represents code stored on ROM/EEPROM 304 that is executed by microprocessor 302. Task selection code 414 enables microprocessor to look across all task sets 406, 408, 410, and 411 and reorder the commands in the task sets and place them in execution queue 412.

According to an embodiment of the present invention, task selection code 414 (executed by microprocessor 302) creates a separate task set, which is implemented in FIG. 4 as execution queue 412. The separate task set includes all the tasks from the individual task sets 406, 408, 410, and 411. The individual tasks in execution queue 412 are reordered by task selection code 414 based upon attributes to optimize execution efficiency. For example, sequential tasks would be sequentially reordered to optimize performance. Those with skill in the art will appreciate that task selection code 414 may utilize any reordering scheme including, but not limited to, a scheme based upon the physical location of the Read/Write heads relative to the physical locations or logical block addresses (LBAs) defined in the queued commands. When the commands are re-ordered in execution queue 412, sequential commands, such as sequential write commands may be executed consecutively regardless of which task set the command was originally queued. If it were necessary to abort individual tasks from execution queue 412 due to an error condition attributed to at least one task set 406, 408, 410, and 411, a drive task manager 416 (code stored in ROM/EEPROM 304 and executed by microprocessor 302) may freeze task execution until the aborted tasks are removed by drive task manager 416.

In another embodiment of the present invention, each hard drive 232a-232d maintains individual task sets 406, 408, 410, and 411 in cache 303. Task selection code 414 reorders the tasks among the task sets 406, 408, 410, and 411 at execution time and sends the reordered tasks to execution queue 412. For example, task selection code 414 interrogates all task sets 406, 408, 410, and 411 and selects the next task to execute based upon which task can be executed the quickest. For example, hard drive 232a-232d may detect the location of the read/write head relative to the location of the LBAs on the drive at any time. Therefore, the optimum task execution strategy is for task selection code 414 to select the next task that will require the least amount of time to reach based on the target LBA of the task.

Figure 5A:
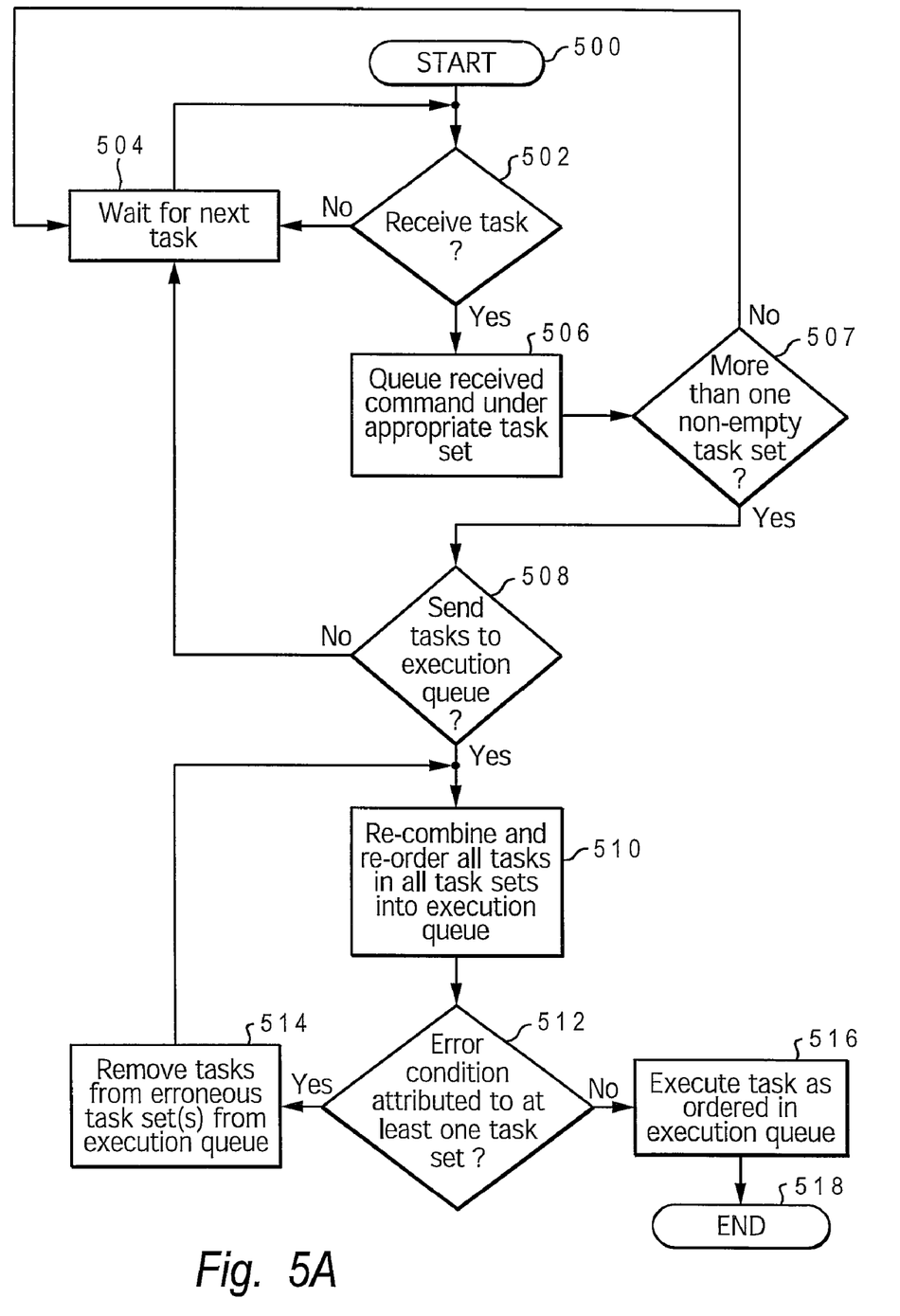
FIG. 5 is a high-level logical flowchart depicting an exemplary method of improving sequential SAS storage device performance in accordance with the present invention.

FIG. 5A is a block diagram illustrating an exemplary method of improving sequential SAS storage device performance in accordance with the present invention. The process begins at step 500 and continues to step 502, which illustrates microprocessor 302 within hard drive 232 determining if a new command from a SAS initiator has been received by host interface chip 301. If a command has not been received, the process continues to step 504, which depicts microprocessor 302 waiting for a next command to be sent from a SAS initiator device. Then, the process returns to step 502 and proceeds in an iterative fashion.

Returning to step 502, if microprocessor 302 determining if a new command has been received, the process proceeds to step 506, which shows microprocessor 302 queuing the received command in the appropriate task set. As previously discussed, SAS target devices (e.g., hard drive 232) organize queued commands by task sets. The SAS target devices maintain a task set for each SAS initiator path. Since SAS initiators send commands via any available SAS initiator path, there may be more one task list maintained per SAS initiator.

The process proceeds to step 507, which shows microprocessor 302 determining if there is more than one non-empty task set. If there is not more than one non-empty task set, the process returns to step 504 and proceeds in an iterative fashion.

If there is more than one non-empty task set, the process continues to step 508, which illustrates microprocessor 302 determining if an execution queue 412 should be assembled by the execution of task selection code 414 by microprocessor 302. An execution queue is created when there is more than one one-empty task set. If not, the process returns to step 504 and proceeds in an iterative fashion. If an execution queue 412 should be assembled, microprocessor 302 executes task selection code 414 stored in ROM/EEPROM 304 and recombines and reorders all commands in all task sets into execution queue 412, as depicted in step 510. The process continues to step 512, which shows microprocessor 302, either by receiving an interrupt from the Servo Control 308, spindle motor control 309, Pre-Amp 306, or R/W Channel 305, determining an error condition has been detected that is attributable to at least one task set. If an error condition as been detected that is attributable to at least one task set, the process continues to step 514, which illustrates drive task manager 416 removing the tasks from the erroneous task set(s) from execution queue 412. The process returns to step 510.

If, however, there is no error condition detected, the process continues to step 516, which illustrates which illustrates microprocessor 302 executing commands in the order dictated by execution queue 412. The process ends, as shown in step 518.

Figure 5B:
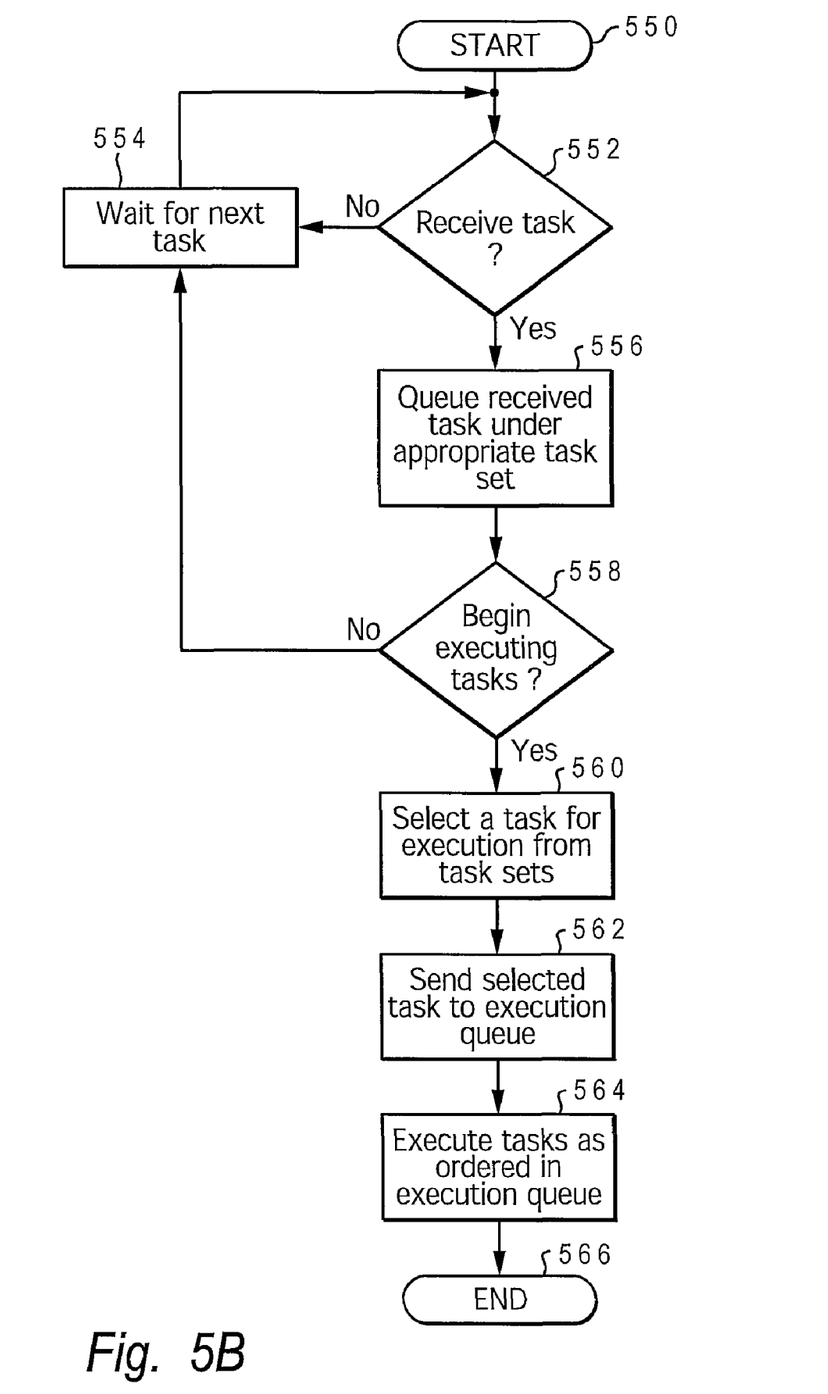

FIG. 5B is a block diagram illustrating another exemplary method of improving sequential SAS storage device performance in accordance with the present invention. The process begins at step 550 and continues to step 552, which illustrates microprocessor 302 within hard drive 232 determining if a new command from an SAS initiator has been received by host interface chip 301. If a command has not been received, the process continues to step 554, which depicts microprocessor 302 waiting for a next command to be sent from a SAS initiator device. Then, the process returns to step 552 and proceeds in an iterative fashion.

Returning to step 552, if microprocessor 302 determining if a new command has been received, the process proceeds to step 556, which shows microprocessor 302 queuing the received command in the appropriate task set. As previously discussed, SAS target devices (e.g., hard drive 232) organize queued commands by task sets. The SAS target devices maintain a task set for each SAS initiator path. Since SAS initiators send commands via any available SAS initiator path, there may be more one task list maintained per SAS initiator.

The process continues to step 558, which illustrates microprocessor 302 determining if the tasks should be executed. If not, the process returns to step 554 and continues in an iterative fashion. If the tasks should be executed, microprocessor 302 executes task selection code 414 stored in ROM/EEPROM 304. Task selection code 414 interrogates all task sets stored in cache 303 and selects a task for execution from the task sets. As previously discussed, an optimum task execution strategy is for task selection code 414 to select the next task that will required the least amount of time to reach based on the target LBA of the task relative to the physical location of the data heads.

The process continues to step 562, which illustrates task selection code 414 sending the selected task to execution queue 412. Then, the process continues to step 564, which illustrates microprocessor 302 executing the tasks as ordered in execution queue 412. The process ends, as illustrated in step 566.

As discussed, the present invention includes a system, computer-implementable method, and computer-readable medium for improving sequential serial attached small computer system interface storage device performance. According to a preferred embodiment, a microprocessor within a target device receives a collection of tasks from at least one initiator device via a collection of initiator paths. The target device is a cyclic non-volatile memory medium. The microprocessor queues the collection of tasks according to a collection of task list. Each task list corresponds to a respective initiator path. The microprocessor combines the collection of tasks in an execution queue. The collection of tasks on the execution queue is reordered based on a priority scheme. The microprocessor executes the collection of tasks from the execution queue.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to Random Access memory (RAM), and communication media, such as computer and telephone networks including Ethernet, the Internet, wireless networks, and like network systems. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A computer-implementable method comprising:
   receiving in a target device a plurality of tasks from at least one initiator device via a plurality of initiator paths, wherein said target device is a cyclic, non-volatile memory medium;
   providing within said target device a plurality of task sets, wherein a separate one of said task sets is associated to each of said plurality of initiator paths;
   queuing each of said plurality of tasks in a corresponding one of said plurality of task sets according to a respective initiator path from which said each task is received;
   providing an execution queue within said target device;
   placing said plurality of tasks from said plurality of task sets into said execution queue in sequential order based on a priority scheme; and
   executing said plurality of tasks from said execution queue according to said sequential order.

2. The method of claim 1, wherein said placing is performed in response to a determination that more than one of said task sets is not empty.

3. The method of claim 1, wherein said executing is performed in response to a determination that said plurality of tasks should be executed.

4. The method of claim 1, further comprising: in response to a determination that there is at least one error condition attributed to at least one task set among said plurality of task sets, removing at least one task associated with said at least one task set from said execution queue.

5. The method of claim 1, wherein said target device and said at least one initiator device are sequential serial attached small computer system interface (SAS) devices.

6. The method of claim 1, wherein said priority scheme is a scheme based upon a physical location of a read/write head in said target device relative to logical block addresses defined in said plurality of tasks.

7. The method of claim 1, wherein said target device is a hard disk drive.

8. A target device, comprising:
   a microprocessor;
   a cyclic, non-volatile storage medium;
   a cache memory containing a plurality of task sets, each of said task sets is associated to an initiator path to be connected to an initiator device, and in response to the receipt of a plurality of tasks from an initiator device, each of said plurality of tasks is queued in a corresponding one of said plurality of task sets according to a respective initiator path from which said each task is received; and
   an execution queue within said cache memory for receiving said plurality of tasks from said plurality of task sets in sequential order based on a priority scheme, wherein said plurality of tasks are executed by said microprocessor from said execution queue according to said sequential order.

9. The target device of claim 8, wherein said target device and said initiator device are sequential serial attached small computer system interface (SAS) devices.

10. The target device of claim 8, wherein said priority scheme is a scheme based upon a physical location of a read/write head in said target device relative to logical block addresses defined in said plurality of tasks.

11. The target device of claim 8, wherein said target device is a hard disk drive.

12. A computer-usable device embodying computer program code, said computer-usable device comprising:
   program code for receiving in a target device a plurality of tasks from at least one initiator device via a plurality of initiator paths, wherein said target device is a cyclic, non-volatile memory medium;

program code for providing within said target device a plurality of task sets, wherein a separate one of said task sets is associated to each of said plurality of initiator paths;

program code for queuing each of said plurality of tasks in a corresponding one of said plurality of task sets according to a respective initiator path from which said each task is received;

program code for providing an execution queue within said target device;

program code for placing said plurality of tasks from said plurality of task sets into said execution queue in sequential order based on a priority scheme; and program code for executing said plurality of tasks from said execution queue according to said sequential order.

13. The computer-usable device of claim 12, wherein said program code for placing is performed in response to a determination that more than one of said task sets is not empty.

14. The computer-usable device of claim 12, wherein said target device and said at least one initiator device are sequential serial attached small computer system interface (SAS) devices.

15. The computer-usable device of claim 12, wherein said priority scheme is a scheme based upon a physical location of a read/write head in said target device relative to logical block addresses defined in said plurality of tasks.

16. The computer-usable device of claim 12, wherein said said target device is a hard disk drive.

* * * * *